US006035725A

United States Patent [19]

Spendel et al.

[11] Patent Number: 6,035,725

[45] **Date of Patent: *Mar. 14, 2000**

[54] GAS METERS

[75] Inventors: Karl Damian Spendel, Nuremberg, Germany; Carl Joseph Powell, Rochdale, United Kingdom

[73] Assignee: Siemens Measurements Limited, Oldham, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,850

[22] Filed: Sep. 10, 1996

[30] Foreign Application Priority Data

Sep. 12, 1995 [GB] United Kingdom .................. 9518610

[51] Int. Cl.[7] .................................................. G01F 1/00

[52] U.S. Cl. .................................................. 73/861

[58] Field of Search ................................ 73/861, 861.02, 73/861.03

[56] References Cited

U.S. PATENT DOCUMENTS

| | | | |
|---|---|---|---|
| 3,632,988 | 1/1972 | Tamawaki et al. | 235/381 |
| 3,644,713 | 2/1972 | Hayakawa et al. | 235/61.9 R |
| 4,199,100 | 4/1980 | Wostl et al. | 235/381 |
| 4,302,977 | 12/1981 | Sisson et al. | 73/658 |
| 4,377,948 | 3/1983 | Tenney, Jr. | 73/861.03 |
| 4,395,626 | 7/1983 | Barker et al. | 235/381 |
| 5,045,691 | 9/1991 | Steward et al. | 250/231.16 |
| 5,257,538 | 11/1993 | Spendell . | |

FOREIGN PATENT DOCUMENTS 0616201 9/1994 European Pat. Off. .

*Primary Examiner*—Richard Chilcot
*Assistant Examiner*—Jewel Thompson
*Attorney, Agent, or Firm*—Evenson, McKeown, Edwards & Lenahan, PLLC

[57] ABSTRACT

A gas meter includes a meter housing, a gas volume measuring system and a valve. The valve and the system are both contained within the housing. An inlet pipe, via which gas is supplied to the system and the valve, and an outlet pipe, via which the gas supplied to the system and the valve is fed to a consumer, are provided. A first communication port is operatively associated with the system. Data signals appertaining to gas supplied to a consumer via the outlet pipe are transmittable via the first communication port. The housing is adapted contiguously to receive a module which is effective to provide predetermined meter functionality. The module includes a further communication port positioned for communication with the system via the first communication port.

13 Claims, 1 Drawing Sheet

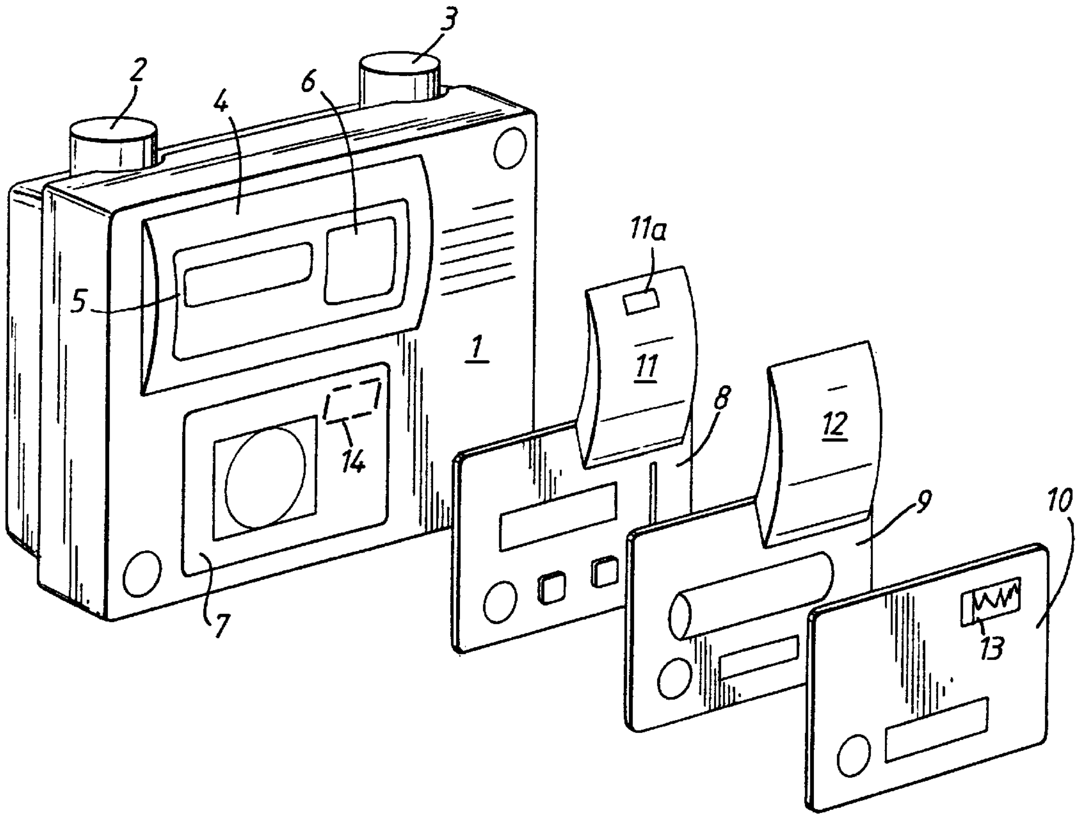
2
3
4
6
5
1
11a
11
8
12
14
9
10
7
13

GAS METERS

BACKGROUND OF THE INVENTION

1. Field of the Invention

This invention relates to gas meters.

Various kinds of gas meter are presently available, which individually provide different functionality. For example, a gas meter may be provided specifically for the supply of gas on a pre-payment basis, the meter being adapted to receive tokens or coins in response to the provision of which gas is supplied. Alternatively, a gas meter may be provided with a local or remote meter reading facility, gas being provided on a credit basis, a consumer being billed in accordance with a volume of gas consumed.

2. Description of the Related Art

With presently available systems, in order to provide for a change of functionality, it is necessary to completely remove an existing meter, which involves specialized services since gas supply pipes will need to be connected/disconnected, and replace it with a different meter affording the required functionality.

SUMMARY OF THE INVENTION

It is an object of the present invention to provide a versatile gas meter which can be readily adapted to afford different functionality without disconnection from a gas supply.

According to the present invention, a gas meter comprises a meter housing, a gas volume measuring system and a valve, wherein the valve and the system are both contained within the housing, an inlet pipe, via which gas is supplied to the system and the valve, and an outlet pipe via which the gas supplied to the system and the valve is fed to a consumer, a first communication port, operatively associated with the system, via which data signals appertaining to gas supplied to a consumer via the outlet pipe are transmittable, the housing being adapted contiguously to receive a module which is effective to provide predetermined meter functionality, which module comprises a further communication port positioned for communication with the system via the said first communication port.

The communication ports may be opto-ports and data may be transmitted therebetween in the form of light signals.

According to one embodiment of the invention, the module is a prepayment module, arranged to register predetermined credits for the supply of gas to the consumer, in response to the provision of tokens or the like, and to provide control signals in dependence upon which the valve is operated when the credits have been used as determined in accordance with light signals fed via the opto-ports from the system, which light signals are indicative of the volume of gas consumed by the consumer.

According to an alternative embodiment of the invention, the module is a credit module which serves to provide an indication of the volume of gas used as indicated by signals transmitted from the system via the opto-ports.

In the case of this alternative embodiment, the module may be adapted to provide signals for a locally positioned transmitter, whereby data appertaining to gas used is transmittable to a remotely positioned monitoring center, whereat it may be used for automatic meter reading and/or automatic billing.

In addition to any one of the foregoing embodiments or the invention or as an alternative, a module may be arranged to provide a display indicative of the monetary value (e.g. in £'s) of gas consumed since a previous credit update, or of gas available for use, or any alternative function wherein a display in terms of monetary value would be of interest to a consumer or a utility supplier.

In order to provide automatic protection against gas leakage in the event of an earthquake/seismic disturbance, the meter may include a seismic signal sensor arranged to produce an alarm signal in response to mechanical vibrations as may be produced by a seismic disturbance, the valve being arranged to operate in dependence upon production of the alarm signal so that gas supply to a consumer is turned off automatically.

The seismic signal sensor may be included in the housing, or alternatively it may be included in a module which is fitted thereto.

Since the sensor is responsive to mechanical vibrations, which are occasioned when the meter or its associated module is moved or interfered with, the sensor may be used for security purposes/fraud prevention. Thus, in the event of interference with the meter or module, the sensor may be arranged to produce a signal which is effective to provide an alarm signal and to turn off the supply of gas.

The alarm signal may be an audible and/or visible warning signal, and/or it may be a signal which is detectable locally or remotely so that an event which may involve unauthorized tampering with the meter is recorded.

When the term 'opto-port' is used herein, it is intended to include devices which are sensitive to light in the visible or in the non-visible spectrum, i.e. ultra-violet or more particularly infra-red.

By providing a gas meter which comprises a housing to which a variety of different modules may be fitted, in accordance with the functionality required, functional metering requirements may be changed without the necessity of employing specialized engineers to de-couple/remove the entire meter and moreover, as will apparent to those skilled in the art, alternative or additional functions may be included which utilized information/intelligence collected within the mater to control gas flow by operation of the valve.

BRIEF DESCRIPTION OF THE DRAWING

One embodiment of the invention will now be described by way of example only, with reference to the accompanying drawing, which is a somewhat schematic perspective exploded view of a meter housing to which modules affording different functions may be fitted.

DESCRIPTION OF THE PREFERED EMBODIMENT

Referring now to FIG. 1, the meter comprises a housing 1 having an inlet pipe 2 and an outlet pipe 3. The inlet pipe 2 is arranged to communicate with the outlet pipe 3 via a gas volume measuring system and a control valve, (which might conveniently be defined by an integral by-stable valve) which is operable to switch off the gas supply between the pipe 2 and the pipe 3. The system and the valve are not shown in the drawing, but may comprise any suitable known systems/valves. The measuring system is operatively associated with a display panel 4 which includes a digital display 5 arranged to provide a digital read out of gas consumed, and an optical interface 6 which may include a magnetic locating system, via which data appertaining to the digital read out and comprising light signals is transmittable at regular intervals or responsively to appropriate optical light interrogation signals Thus, it will be appreciated that the interface 6 comprises an opto-transmitter/receiver. The housing 1 is provided with a door 7 which is removable to facilitate the contiguous fitment of a module chosen from a range of modules 8, 9 and 10, each of which offers different functionality. Thus, in the present example, the module 8 is a prepayment module arranged to receive tokens or 'smart' cards; the module 9 embodies a transmitter which facilitates automatic remote meter reading, and the module 10 is a module which includes an electrical outlet port (as will hereinafter be described) by means of which signals may be fed to or from the meter without using an optical interface.

In order to facilitate communication between a chosen module and the interface 6, projections 11 and 12 containing opto-couplers are provided which are arranged to project so as to overlay the display panel 4. As shown in the drawing, the front face of the display panel 4 is convex and accordingly the rear face of the projections 11 and 12, which overlay this convex surface are, arranged to have complementary concave surfaces which are therefore contiguous with it when the modules 8 or 9 respectively are fitted in the housing 1. In order to provide an optical interface via which signals may be fed to or taken from a meter, an opto-port may be provided for this purpose, such as an opto-port 11*a* in the projection 11.

In the case of the module 10, however, an electrical connector 13 is provided which is positioned so as to align with a corresponding electrical connector 14 in the housing 1 so that in this case, communication between the module and the housing may be effected without utilizing opto-couplers. It will be appreciated that the modules 8, 9 and 10 may be designed to provide different functionality so as alternatively to afford the functions of a prepayment meter, a credit meter and/or remote meter reading and/or billing facilities. Thus, it will be understood that in the case of a prepayment meter, for example, provision for acceptance by the module of prepayment tokens, 'smart' cards or the like will be made.

In any of the foregoing embodiments, an earthquake detector may be included in the housing, or in a module fitted thereto, in dependence upon which the valve is operated in the event of a seismic disturbance, whereby the supply of gas to a consumer is turned off automatically. As hereinbefore explained, this detector may be conveniently be used to detect meter tampering.

Various modifications may be made to the meter hereinbefore described without departing from the scope of the invention and for example, it is apparent that the housing 1 may, according to one embodiment of the invention, be a sealed gas tight unit, whereas according to alternative embodiments, the housing may simply comprise a metal or plastics case, in which the various parts are fitted, and which simply supports the inlet pipes 2 and 3 so that they are arranged to extend within the case appropriately.

It is also contemplated that a plurality of modules may be adapted to be stacked one upon the other and fitted to the housing 1, whereby a plurality of functions may be afforded by the stacked modules in combination. In order to facilitate this stacking, it is apparent that means will be provided to facilitate electrical and/or optical communication between the stacked modules.

We claim:

1. A gas meter comprising:

a meter housing including an opening defined therein, a gas volume measuring system, a valve, the valve and the system both contained within the housing, an inlet pipe, via which gas is supplied to the system and the valve, an outlet pipe via which the gas supplied to the system and the valve is fed to a consumer, a first communication port, operatively associated with the system, via which data signals appertaining to gas supplied to a consumer via the outlet pipe are transmittable, a module which is effective to provide predetermined meter functionality, said module being one of a variety of different modules alternatively receivable in said opening, the housing being adapted contiguously to receive the modules without the need to interrupt the gas supply or dismantle said meter housing, and a further communication port included in the module positioned for communication with the system via the first communication port.

2. A gas meter as claimed in claim 1, wherein the communication ports are first and further opto-ports, communication therebetween being in the form of light signals.

3. A gas meter as claimed in claim 2, wherein the first and further opto-ports are coupled to facilitate the transmission of light therebetween via a projection on the module which extends across a front face of the housing and which is contiguous therewith.

4. A gas meter as claimed in claim 3, wherein the projection which extends across the front face of the housing serves to link the first opto-port with the said further opto-port.

5. A gas meter as claimed in claim 2, wherein the module is a prepayment module, arranged to register predetermined credits for the supply of gas to the consumer, in response to the provision of tokens or the like, and to provide control signals in dependence upon which the valve is operated when the credits have been used as determined in accordance with light signals fed, via the opto-ports from the system, which light signals are indicative o)f the volume of gas consumed by the consumer.

6. A gas meter as claimed in claim 2, wherein the module is a credit module which serves to provide an indication of the volume of gas used as indicated by signals transmitted from the system via the opto-ports.

7. A gas meter as claimed in claim 6, wherein the module is adapted to provide signals for a locally positioned transmitter, whereby data appertaining to gas used are transmittable to a remotely positioned monitoring center.

8. A gas meter as claimed in claim 7, wherein the transmitter forms a part of the module.

9. A gas meter, as claimed in claim 1, comprising a seismic detector responsive to mechanical vibrations for providing electrical signals in dependence upon which the valve is operated.

10. A gas meter as claimed in claim 9, wherein the detector is included in a module fitted to the housing.

11. A gas meter comprising:

a meter housing including an opening defined therein, a gas volume measuring system, a valve, the valve and the system both contained within the housing, an inlet pipe, via which gas is supplied to the system and the valve, an outlet pipe via which the gas supplied to the system and the valve is fed to a consumer, a first communication port, operatively associated with the system, via which data signals appertaining to gas supplied to a consumer via the outlet pipe are transmittable, a replaceable prepayment module arranged to receive tokens providing credit for supply of gas to a consumer, said replaceable prepayment module being one of a variety of different modules alternatively receivable in said opening, the housing being adapted contiguously to receive the modules without the need to interrupt the gas supply or dismantle said meter housing, and a further communication port included in the replaceable prepayment module positioned for communication with the system via the first communication port.

12. A gas meter comprising:

a meter housing including an opening defined therein, a gas volume measuring system, a valve, the valve and the system both contained within the housing, an inlet pipe, via which gas is supplied to the system and the valve, an outlet pipe via which the gas supplied to the system and the valve is fed to a consumer, a first communication port, operatively associated with the system, via which data signals appertaining to gas supplied to a consumer via the outlet pipe are transmittable, a replaceable transmitter module providing transmittable signals to a remotely positioned monitoring center for automatic billing, said replaceable transmitter module being one of a variety of different modules alternatively receivable in said opening, the housing being adapted contiguously to receive the modules without the need to interrupt the gas supply or dismantle said meter housing, and a further communication port included in the replaceable prepayment module positioned for communication with the system via the first communication port.

13. A gas meter comprising:

a meter housing including an opening defined therein, a gas volume measuring system, a valve, the valve and the system both contained within the housing, an inlet pipe, via which gas is supplied to the system and the valve, an outlet pipe via which the gas supplied to the system and the valve is fed to a consumer, a first communication port, operatively associated with the system, via which data signals appertaining to gas supplied to a consumer via the outlet pipe are transmittable, a replaceable module including an electrical connection permitting communication between the module and the housing, said replaceable module being one of a variety of different modules alternatively receivable in said opening, the housing being adapted contiguously to receive the modules without the need to interrupt the gas supply or dismantle said meter housing, and a further communication port included in the replaceable module positioned for communication with the system via the first communication port.

* * * * *